W. M. WADLEIGH.
TONGUE TRUCK FOR HARVESTERS AND OTHER MACHINES.
APPLICATION FILED MAY 15, 1908.
931,902.
Patented Aug. 24, 1909.
3 SHEETS—SHEET 1.
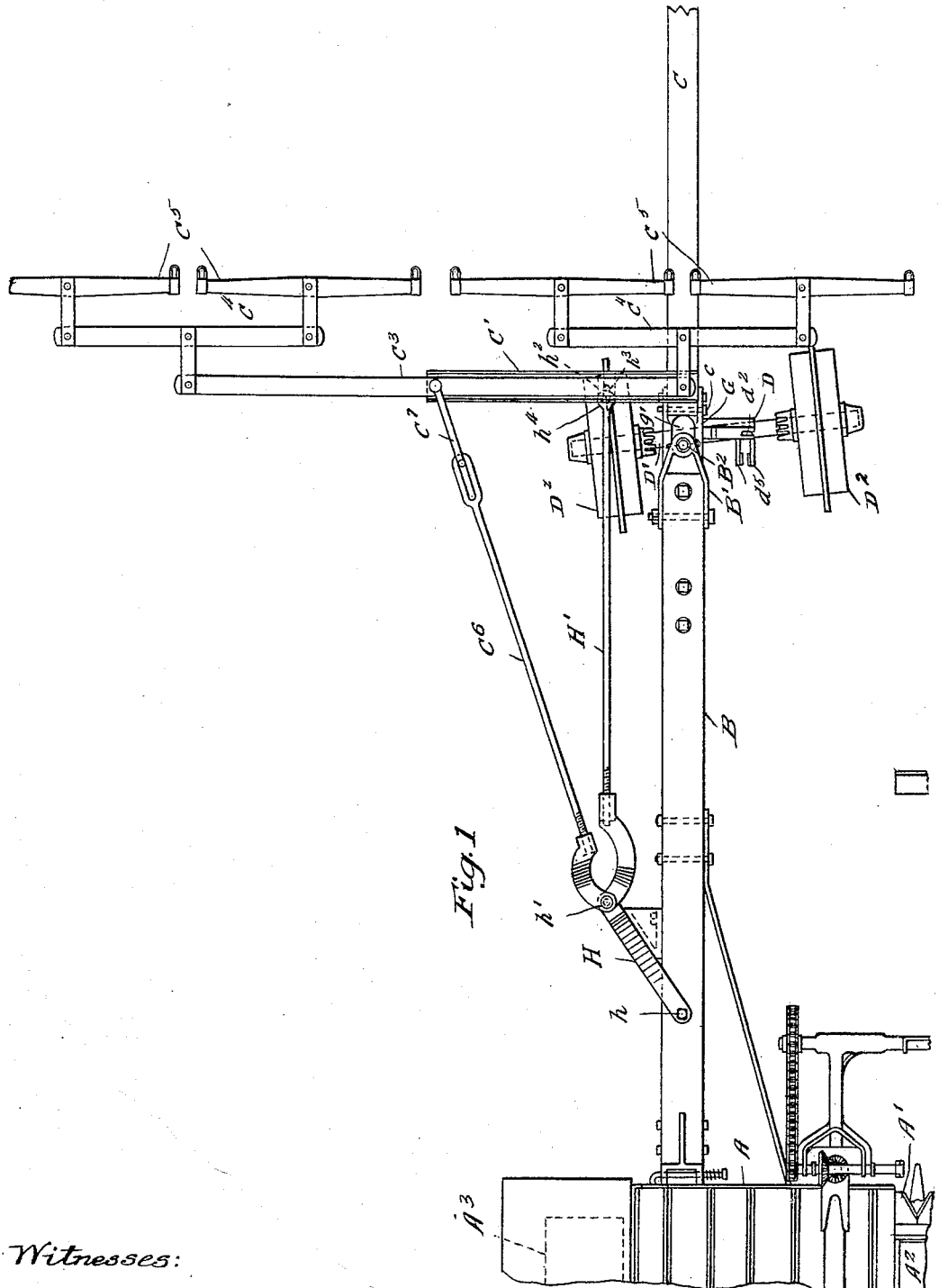
Witnesses:
Wm. Geiger
H. W. Munday
Inventor:
William M. Wadleigh
By Munday, Evarts, Adcock & Clarke
Attorneys W. M. WADLEIGH.
TONGUE TRUCK FOR HARVESTERS AND OTHER MACHINES.
APPLICATION FILED MAY 15, 1908.
931,902.
Patented Aug. 24, 1909.
3 SHEETS—SHEET 2.
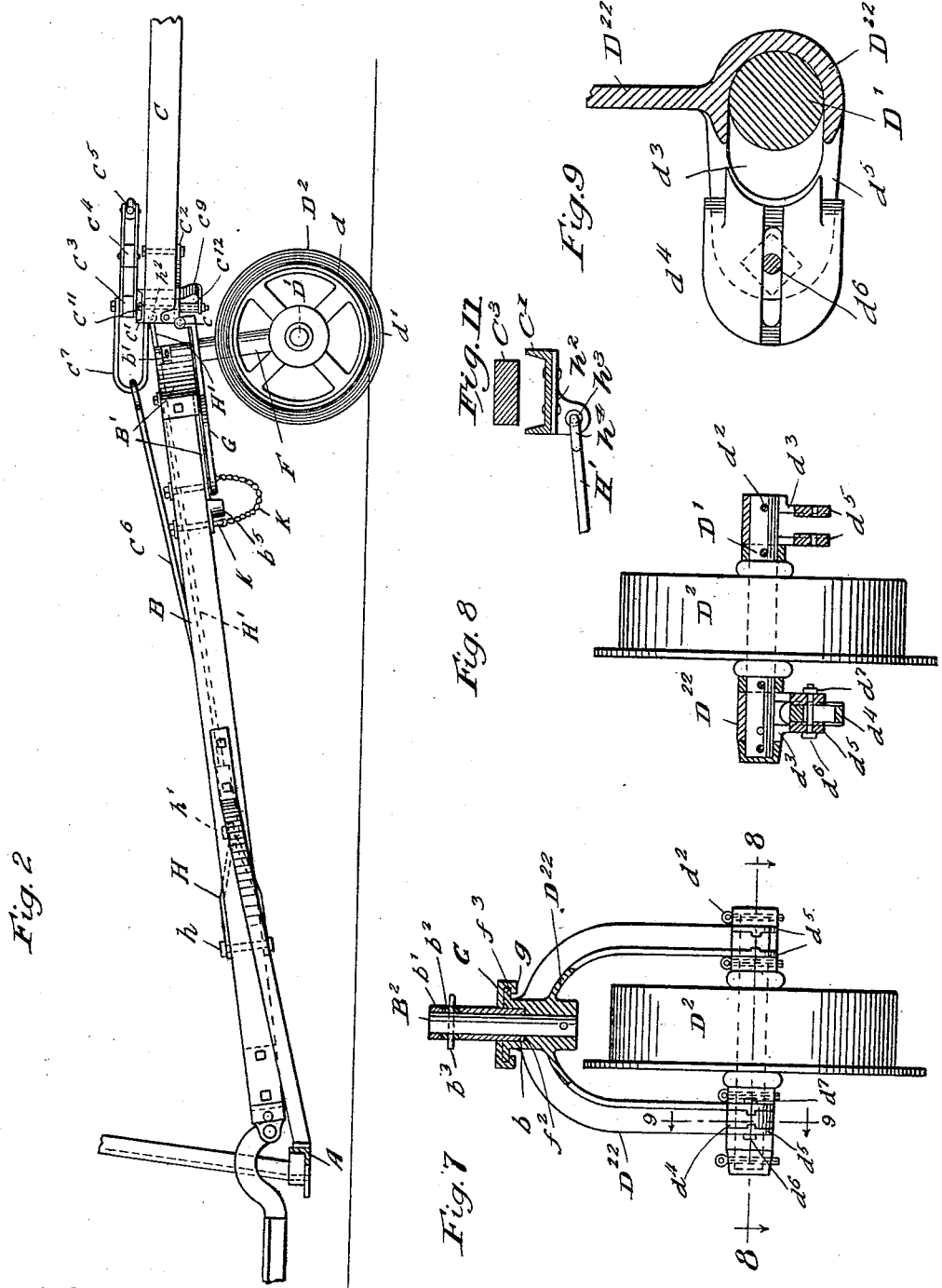
Witnesses:
Wm. Geiger
H. W. Munday
Inventor:
William M. Wadleigh
By Munday, Evarts, Adcock & Clarke.
Attorneys W. M. WADLEIGH.
TONGUE TRUCK FOR HARVESTERS AND OTHER MACHINES.
APPLICATION FILED MAY 15, 1908.
931,902.
Patented Aug. 24, 1909.
3 SHEETS—SHEET 3.
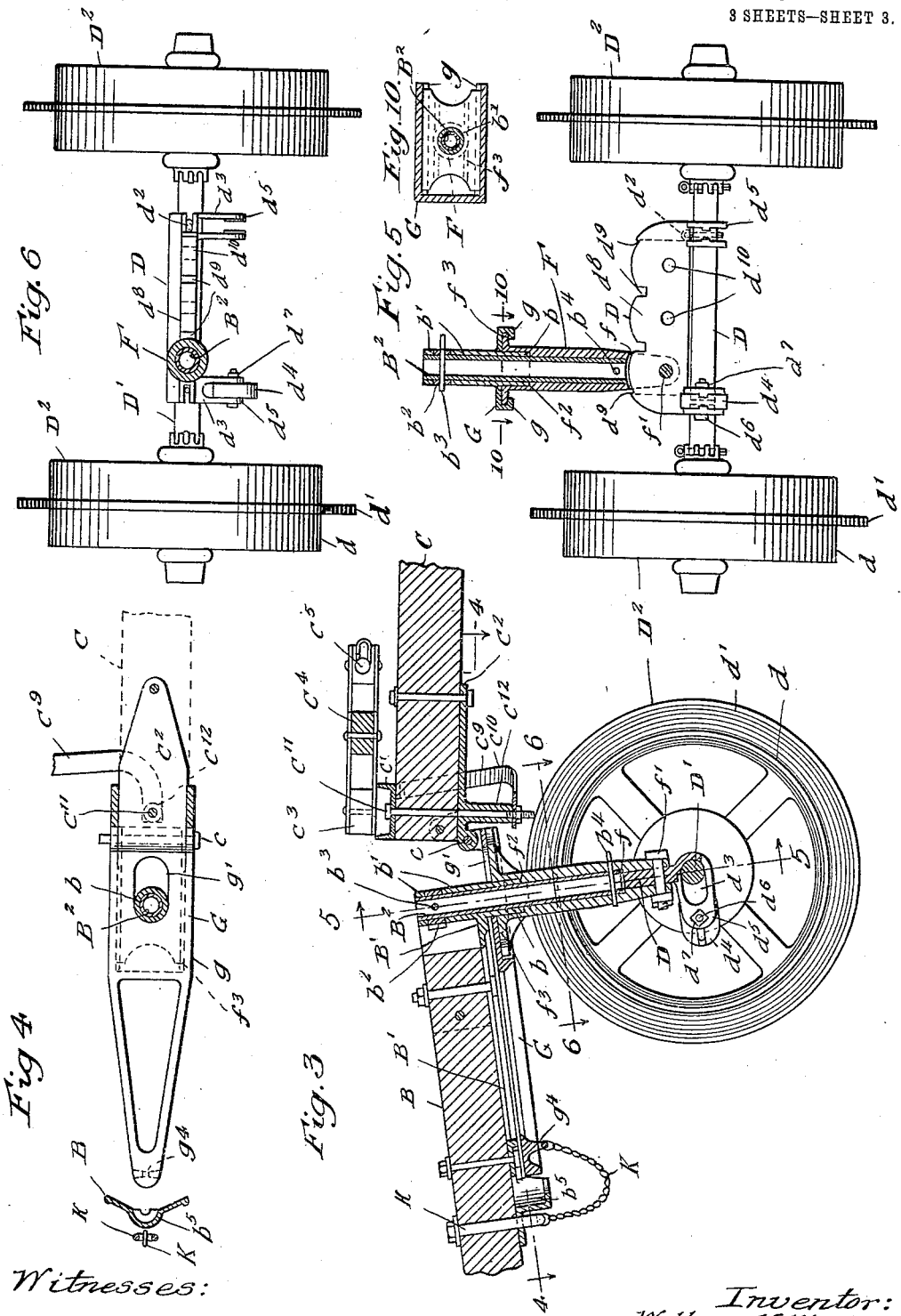
Witnesses:
Wm. Geiger
H. W. Munday
Inventor:
William M. Wadleigh
By Munday, Evarts, Adcock & Clarke,
Attorneys

UNITED STATES PATENT OFFICE.

WILLIAM M. WADLEIGH, OF CHICAGO, ILLINOIS.

TONGUE-TRUCK FOR HARVESTERS AND OTHER MACHINES.

931,902. Specification of Letters Patent. Patented Aug. 24, 1909.

Continuation of application Serial No. 329,845, filed August 9, 1906. This application filed May 15, 1908.

Serial No. 433,029.

*To all whom it may concern:*

Be it known that I, WILLIAM M. WADLEIGH, a citizen of the United States, residing in Chicago, in the county of Cook and State of Illinois, have invented a new and useful Improvement in Tongue-Trucks for Harvesters and other Machines, of which the following is a specification.

My invention relates to improvements in tongue trucks or supports for harvesters, reapers, mowers and other machines.

In tongue trucks of harvesters heretofore in use, it has been customary to provide them with side draft resisting wheels, (or wheels having in addition to the ordinary cylindrical rim, a colter-acting flange or blade which enables the truck wheels to effectually resist a sliding movement in the direction of the axle) and to set or adjust the axle of the truck wheel or wheels so that the wheels are slightly inclined stubbleward from the line of cut or line of advance, the stubbleward inclination of the wheels serving to counteract, neutralize or overcome the side draft of the harvester. But as the side draft is constantly varying in amount, owing to varying conditions of the grain, as light or heavy, standing or down or tangled, and to varying conditions of the ground as level or inclined, hard or soft, and other conditions affecting the resistance encountered by the sickle bar and grain wheel and outside grain divider, the stubbleward inclination of the tongue truck side draft resisting wheels is sometimes too slight and sometimes too great in amount to properly balance or neutralize the side draft of the machine, so that the machine will frequently tend to run into the grain or run out of the grain, or to incline its path sometimes to one side, and sometimes to the other, according as the stubbleward inclination of the tongue truck wheel happens to be too little or too great to meet the varying conditions which the harvester encounters from time to time. And in the harvester tongue trucks heretofore in use, great difficulty has been experienced in backing the machine by the horses as the supplemental tongue of the harvester is pivotally connected at its front end to the tongue truck, so that it is difficult to keep the main tongue in line with the supplemental tongue in backing, a difficulty which is greatly aggravated by the circumstance that the axle of the tongue truck wheel or wheels is necessarily set at an inclination instead of at a right angle to the tongue, thus tending to cause the truck wheels themselves in backing to move in a path at an angle to the tongue and to throw the main tongue and supplemental tongue, which are pivotally connected through the supporting truck, out of line with each other and cause the machine in backing to swing around or move in a curved path.

The object of my invention is to provide a tongue truck for harvesters and other machines, of a strong, simple, efficient and durable construction, by means of which the side draft of the harvester or other machine may be effectually resisted, neutralized or counteracted and by which the stubbleward inclination of the truck wheel or wheels will automatically regulate or accommodate itself to the side draft of the machine as the same may vary from time to time owing to varying conditions of grain or ground, and by means of which the harvester or other machine may be readily and easily backed by the horses in a straight line, notwithstanding the pivotal connection of the supplemental tongue of the harvester or machine to the tongue truck.

My invention comprises the means I employ to practically accomplish this object or result. That is to say, it comprises all, as herein more particularly set forth in the claims in connection with the supplemental or stub tongue of a harvester or other machine, a tongue truck having a side draft resisting wheel or wheels, and an axle having a pivotal connection with the main tongue through its connection with a frame piece or bolster and an upright standard to which the main tongue is connected, so that this axle may be free to oscillate to a limited extent, and thus free to vary the stubbleward inclination of the truck wheel or wheels as the side draft may vary, and so that when the machine is being backed by the horses through the main tongue and supplemental tongue, the truck axle may resume its right angle position to the main tongue.

It further comprises in connection with these parts, in providing the connection between the truck axle and the main tongue with an adjustable stop to limit the extent of stubbleward inclination of the truck axle.

It further comprises a horizontally oscillatory tongue truck axle pivotally connected to the truck frame piece or bolster to one side of the middle thereof so that the inner wheel, the one next to the grain will be nearer the pivot than the outer wheel.

It further comprises connecting the upright standard of the truck to the truck frame piece or bolster to one side of the middle, preferably the outside, so that the greater portion of the weight of the tongue and truck will come upon the outer wheel.

It further comprises making this connection of a right and left construction so that the same tongue truck may be used with a right hand on the left hand construction of harvester or other machine.

It further comprises providing the connection between the main tongue and the truck axle with a sliding member adapted to engage and disengage by its sliding movement the stub or supplemental tongue or a projection thereon, and thus lock the main tongue and supplemental tongue rigid together and in line with each other when the main tongue slides backward in starting to back the machine, so that, in backing, the two tongues will be locked rigidly together in line with each other and act as one tongue, while the forward longitudinal movement of the main tongue frees the sliding member of the connection from the supplemental tongue and thus leaves it again free to turn in respect to the tongue truck.

It further consists in connection with the tongue truck, the main tongue and the supplemental tongue pivoted at its front end to the tongue truck, and slidably connected with the main tongue, in providing the diagonally extending draft rod, which connects with the main tongue through the lateral evener supporting bar at the center of draft, with a pivoted or hinged arm and a toggle acting arm or push rod also connected to the main tongue, preferably through the evener bar near the main tongue, or inside the draft rod connection therewith, so that after the main tongue has slipped backward in backing and thus locked the supplemental tongue rigidly thereto and to the tongue truck, this toggle acting arm or push rod will cause the main tongue to again slip forward and leave the supplemental tongue again free to turn in respect to the truck by the tendency of the two arms or members of the draft rod to straighten out or approach a straight line when the machine is again started forward and the draft comes upon the draft rod. By this means the tongue truck and stub tongue are locked rigidly together in backing, while they are free to oscillate or turn in respect to the stub or supplemental tongue at all other times or in pulling: and also in backing the axle of the truck wheels automatically assumes a position at right angles to the main and stub tongues which are locked together.

By thus providing in my invention, the main tongue, stub tongue and tongue truck with means for locking the main tongue and stub tongue rigidly together in line with each other in backing, and with means for causing the truck axle to again automatically assume a right angle position in respect to the main tongue and supplemental tongue, the machine may be readily backed in a straight line the same as if it had only one single rigid tongue. And by providing in my invention, the main tongue, supplemental or stub tongue and tongue truck with means whereby the axle of the tongue truck may oscillate slightly or to a limited extent, and thus vary the stubbleward inclination of the truck wheels to the line of cut or line of advance, I have discovered and demonstrated by my experiments, that the stubbleward inclination of the side draft resisting wheel or wheels of the truck will automatically vary or adjust itself to the side draft, as the side draft varies in extent or amount owing to varying conditions of grain or ground: thus entirely freeing the main tongue and the horses from all side draft in both directions, toward the grain and toward the stubble, and freeing the machine from all tendency to run into or out of the grain.

My invention further consists in the novel construction of parts and devices, and in the novel combinations of parts and devices herein shown and described.

In the accompanying drawing, forming a part of this specification, Figure 1 is a plan view of a tongue truck for harvesters embodying my invention, showing some portions of the harvesters to which the truck is applied. Fig. 2 is a side elevation. Fig. 3 is a central vertical longitudinal section of the tongue truck. Fig. 4 is a horizontal section on line 4—4 of Fig. 3. Fig. 5 is a cross section on line 5—5 of Fig. 3. Fig. 6 is a horizontal section on line 6—6 of Fig. 3. Fig. 7 is a modification illustrating the application of my invention to a single wheel tongue truck. Fig. 8 is a horizontal section on line 8—8 of Fig. 7 and Fig. 9 is a cross section on line 9—9 of Fig. 7. Fig. 10 is a detail section on line 10—10 of Fig. 5. Fig. 11 is a detail view, partly in section, of parts herein-after described.

In the drawing A represents a portion of the frame of the harvester or other machine to which my invention is applied, $A^1$ the sickle bar, $A^2$ the platform, and $A^3$ the drive wheel of the harvester or other machine. B is the stub or supplemental tongue connected to the harvester or other machine in the usual manner. C is the main tongue, $C^1$ the right angle evener supporting bar secured thereto, $C^2$ the evener furnished with the necessary double-trees $C^4$ and whiffle-trees $C^5$ for hitching the horses to the machine and $C^6$ is the draft rod connected to the evener by a clevis $C^7$ which preferably also embraces the evener support $C^1$. All these parts are or may be of any ordinary or suitable construction.

D is the truck frame piece or bolster through which the truck axle $D^1$ extends and $D^2$ the truck wheels, the same having in addition to the tread or rim $d$, a side draft resisting annular flange or colter blade $d^1$. The axle $D^1$ is pivotally connected to the truck frame piece or bolster D at one end thereof by a removable upright pin or pivot $d^2$, so that the axle may vibrate in a horizontal plane about this pivot to a limited extent through a slotted guide $d^3$ at the other end of the truck frame piece or bolster D, and thus cause the truck axle to assume an inclined position in respect to the truck bolster or frame piece D and the wheel or wheels $D^2$ a stubbleward inclination to the line of cut or line of advance of the machine. As the tongue truck axle is thus free to vibrate horizontally to a limited extent independent of both the main and stub tongues, the stubbleward inclination of the truck wheels will automatically vary or adjust itself to the amount or extent of side draft encountered by the sickle bar and grain wheel, and which tends to swing or turn the stub and main tongues into the grain. This automatic action may be explained as resulting from the fact that any increase in the side draft which tends to swing the stub tongue into the grain tends at the same time to increase the variations from a right angle which the tongue truck axle bears to the tongues, and which increasing of such angle increases the stubbleward inclination of the truck wheels and their side draft resisting power. And when, for any cause, the side draft diminishes in extent or amount, the stubbleward inclination of the tongue truck wheels automatically diminishes, because of the natural inclination of the truck wheels to travel in the line of least resistance, and thus cause the truck axle to approximate as near a right angle to the tongues as its pivoting to one side of its middle and the side draft will permit. In this connection it should be borne in mind that the truck axle, in order to cause the truck wheels to resist side draft, stands at an obtuse angle to the tongues, and any grainward movement of the tongues swinging about the bull wheel as a pivot, tends to increase the obtuseness of the truck axle to the tongues, in other words tends to increase the stubbleward inclination of the truck wheels and their consequent side draft resisting power. This action is due to the fact that the truck axle is free to oscillate in respect to and independent of the tongues. This action or operation may also be explained as being due to the fact that an increase of resistance on the grainward side causes the stub and main tongues to swing about a point which is directly beneath the axis of the wheel ($A^3$ Fig. 1). This causes the point $B^2$ to swing about the point as a center rearwardly and in a grainward direction along the arc of the circle whose radius is the distance from $B^2$ to the point under the wheel. This movement or tendency toward movement is the resultant of two combined forces both of which originate at the point $B^2$. One of these two forces may be considered to act in a grainward direction parallel to the axis of the truck wheels while the other component acts rearwardly in a direction at right angles to the first component. Of these two the first does not affect the inclination of the axis of the truck, but the rearward component tends to alter the angle between the truck axle and the tongues. The slotted guide $d^3$ of the bolster D is provided with an adjustable stop $d^4$ fitting between the ears $d^5$ and adjustably secured in any desired position by a clamp bolt $d^6$ which is furnished with a threaded nut $d^7$. The ears $d^5$ are preferably of malleable metal so that they will spring together sufficiently to properly clamp the movable stop. The stop may be placed to limit the stubbleward inclination of the truck wheels at any point desired. To adapt the truck for use upon right or left hand harvesters or other machines, the truck bolster is preferably provided with a slot at each end for the pivot pin $d^2$ and with two slotted guides $d^3$. Instead of locating both of these slotted guides at one end of the bolster, I prefer to locate one of these slotted guides at each end of the bolster as this gives greater uniformity in shape to the bolster or truck frame piece D, which I prefer to make of malleable iron.

The stub or supplemental tongue B of the harvester or other machine has a pivotal connection with the truck frame piece or bolster D, adapting the truck and said tongue to turn or swing horizontally in respect to each other, and also a lateral rocking or tilting connection therewith, adapting the harvester or other machine and the truck bolster or frame piece D and the axle $D^1$ of the truck to assume varying inclinations in respect to each other according to the unevenness of the ground. This pivotal and lateral rocking connection between the truck frame piece and bolster and the stub or supplemental tongue preferably consists in an upright hollow standard F, having a slot $f$ at its lower end fitting an upright web $d^8$ on the truck bolster or frame piece D and connected thereto by a pivot pin or bolt $f^1$ which permits the standard F to rock or vibrate laterally from side to side to a slight extent limited by the stops or shoulders $d^9$ $d^9$ on the web $d^8$, and a hinge member $B^1$ secured to the front end of the stub tongue B and a pivot pin $B^2$ which is preferably a hollow tube. The hinge piece $B^1$ has a hub or pivot member $b$, fitting in an enlargement or circular recess $f^2$ at the upper end of the standard F, and eyes $b^1$ through which the pivot pin $B^2$ extends. The pivot pin is locked in position by a collar $b^2$ fitting between the eyes $b^1$ and secured to the pivot pin by a cross pin $b^3$. A cotter pin $b^4$ also extends through the standard F and pivot pin $B^2$.

The connection between the main tongue and the truck frame piece or bolster D holds these two parts rigidly at right angles to each other but permits the truck bolster or frame piece to rock laterally in respect thereto to accommodate unevenness of the ground over which the truck wheels pass, and at the same time permits the main tongue to slide longitudinally to a limited extent in respect to the truck bolster or frame piece and the stub tongue connected thereto as above described. This rocking connection between the main tongue and the truck bolster D preferably consists in the upright standard F. The longitudinally movable or sliding connection between the main tongue and the standard F preferably consists in a slide G, furnished on its under side with suitable guides $g$, which engage a suitable guide $f^3$ on the standard F, said guides $f^3$ being preferably in the form of an integral plate or flange at the upper end of said standard. The main tongue C is preferably hinged by a horizontal pin or bolt $c$ to the slide G by a hinge strap $C^2$ secured to the tongue C preferably on its under side. The slide G has a longitudinal slot $g^1$ therein which limits the sliding movement of the main tongue in respect to the stub tongue and the tongue truck by engagement with the hub $b$ on the hinge plate $B^1$ of the stub tongue. The hinge plate $B^1$ is preferably provided with a projection $b^5$ in the form of a socket to engage the slide G, preferably at its rear end, and thus lock the main tongue and stub tongue and the tongue truck bolster and standard rigidly together, with the main tongue and stub tongue in line with each other, when the main tongue is pushed backward in backing so that the slide G engages the projection or socket $b^5$. To cause the main tongue to be again pushed forward after the backing operation is finished when the machine is again pulled forward by strain of the draft rod $C^6$, and thus again leave the stub tongue and tongue truck free to turn in respect to each other, I provide the draft rod $C^6$ with a hinged arm or long clevis H connected by a pivot pin or bolt $h$ to the stub tongue and at its outer end by a pivot pin or bolt $h^1$ to the draft rod $C^6$ and connect the outer end of this hinged arm or clevis H with the main tongue by a push rod or toggle arm $H^1$, the same being preferably connected to the tongue through the evener support $C^1$ by a bracket $h^2$ having an eye $h^3$ engaging an eye $h^4$ on the front end of the push rod $H^1$. The pulling strain on the draft rod $C^6$ tends to straighten out or swing inward the hinged arm H and thus cause the push rod $H^1$ to push the tongue C forward and free the slide G from its locking socket or projection $b^5$ on the stub tongue B. The evener supporting arm $C^1$ is preferably provided with a downwardly extending brace $C^9$ having a curved end $C^{10}$ connected by the bolt $C^{11}$ to a downwardly extending projection $C^{12}$ on the hinge plate $C^2$.

In the modification shown at Fig. 7, the truck has but a single wheel, the same being mounted centrally under the bolster or frame piece $D^{22}$ which is made in one piece with the standard F employed in the two wheeled truck construction before described, as the pivot or joint between the parts F D of such two wheeled construction is not necessary in a single wheel truck.

The upright web $d^8$ of the truck frame piece or bolster D is provided with three pivot holes $d^{10}$ for connection with the upright standard F so that the upright standard may be placed nearer the outer truck wheel and thus throw the greater portion of the weight of the tongues thereon. This prevents the outer truck wheel in turning corners from interfering with the hind feet of the adjacent horse, and also prevents the tendency of the outer truck wheel to raise up and the inner truck wheel to dig into the ground in turning corners. The two outer pivot holes in the web $d^8$ adapt the truck for use with right and left hand harvesters; and the middle hole may be used when desired with certain machines. As the horizontally oscillatory truck axle is pivotally connected to the truck frame piece or bolster on the grain side of the middle, the outer truck wheel tends to swing backward, thus throwing the inner truck wheel adjacent to the grain slightly in advance of the outer truck wheel and giving the truck wheels a stubbleward inclination sufficient to counteract the side draft of the harvester or machine. This action or mode of operation is also produced by the arrangement of the truck standard F to one side of the middle, nearer the outer end of the bolster or frame piece D so that the greater portion of the weight of the tongues, etc., comes upon the outer truck wheel, which also tends to cause it to lag back and the wheels to assume a stubbleward inclination even though the truck axle were pivoted at its middle or midway between the wheels to the truck bolster.

To limit the turning movement of the truck D in respect to the stub or supplemental tongue B, and prevent danger of the inside horse coming in contact with the reel, I provide a stop connection K, preferably a chain or flexible connection, between the truck and stub tongue B. This chain or stop connection K is preferably attached at one end to the stub tongue B by an eye bolt $k$, and at the other end to the slide G which is provided with an eye $g^4$ on its under side to receive the end of the chain K and thus limit the turning movement of the truck and stub tongue B in respect to each other. This chain should be long enough to permit the stub tongue and truck to turn a quarter around or through an arc of about ninety degrees, either way. As the upright pivotal connection of the truck frame piece or bolster with the stub tongue is nearer the outer wheel than the inner wheel, the outer wheel is brought nearer the tongues than the inner wheel, and this causes the outer wheel to swing on a shorter radius in turning, and consequently keeps it closer to the tongues and more out of the way of the hind feet of the outside horse adjacent to the main tongue when the machine is being turned sharply around.

This application is a continuation of my original application, Serial No. 329,845, filed August 9, 1906.

I claim:

1. In a tongue support for harvesters and other machines, the combination with a stub or supplemental tongue connected to the machine, of a main tongue and a side draft resisting tongue truck having an axle free to oscillate horizontally to a limited extent and connections whereby the wheel or wheels of the truck automatically adjust their stubbleward inclination to the line of cut or advance as the side draft varies under the varying conditions of grain or ground, substantially as specified.

2. The combination with a stub tongue, of a main tongue and a tongue truck provided with a frame-piece having a pivotal connection with said stub tongue and means for maintaining it at right angles to said main tongue, said truck having a side draft resisting wheel and an axle therefor pivotally connected to said frame-piece and free to oscillate horizontally to a limited extent in respect thereto and independently of both of said tongues, and means for limiting the free oscillatory movement of said axle, substantially as specified.

3. The combination with a stub or supplemental tongue, of a main tongue and a tongue truck having a frame piece or bolster at right angles to the main tongue and provided with an axle having a pivotal connection with said frame piece or bolster at one end thereof, and a slotted connection therewith at the other end thereof to enable the axle to automatically assume a right angle position in respect to the main tongue in backing, and an inclined position in pulling, substantially as specified.

4. The combination with a stub or supplemental tongue, of a main tongue, a tongue truck having a pair of wheels and an axle pivotally connected to said stub or supplemental tongue and free to oscillate to a limited extent horizontally independent of said tongue, and means for locking or holding the main tongue, stub tongue and truck rigidly together with the main tongue and stub tongue in line with each other and the truck axle at right angles thereto when backing pressure is applied to the main tongue, substantially as specified.

5. The combination with a supplemental tongue attached to a machine, of a tongue truck pivotally connected to said supplemental tongue, and a main tongue, extending at right angles from the tongue truck and having a sliding connection with said supplemental tongue to lock the two tongues together in backing, substantially as specified.

6. The combination with a stub tongue, of a main tongue, a tongue truck having a pivotal connection with the supplemental tongue and a slidable connection with the main tongue, substantially as specified.

7. The combination with a stub or supplemental tongue attached to the machine, of a main tongue, a tongue truck having a pivotal connection with the supplemental tongue and a sliding connection with the main tongue, and interengaging devices for holding the main tongue and supplemental tongue from turning or swinging horizontally in respect to each other, said holding devices being engaged by the backward movement of the main tongue and disengaged by its forward movement, substantially as specified.

8. The combination with a stub tongue, a tongue truck pivotally connected thereto, and a slidable main tongue extending from the truck, devices for holding the tongues from turning horizontally in respect to each other when the main tongue is in its backward position, a draft rod extending at an angle to the stub tongue and having a hinged arm and a push rod or toggle arm extending from said hinged arm and connected to the main tongue to push it forward and disengage said holding devices when draft is applied to the draft rod, substantially as specified.

9. The combination with a stub tongue, of a main tongue, a tongue-truck-frame-piece pivotally connected to said stub tongue and provided with means for maintaining it at right angles to said main tongue, a pair of wheels, an axle therefor having a pivotal connection with said frame-piece and free to oscillate horizontally to a limited extent in respect thereto and independently of both of said tongues, and means for limiting the free oscillatory movement of said axle, substantially as specified.

10. The combination with a main tongue and a stub tongue, of a tongue-truck-frame-piece having a pivotal connection with said stub tongue and means for maintaining it at right angles to said main tongue, an axle furnished with a wheel and having a pivotal connection with said frame-piece and free to oscillate horizontally to a limited extent in respect to said frame-piece and independently of both said tongues about an upright axis intersecting said axle, and means for limiting the free oscillatory movement of said axle, substantially as specified.

11. The combination with a stub tongue, of a tongue supporting truck, having a pivotal connection therewith, and provided with a main tongue, and means for locking or holding said tongue truck from turning in respect to said stub tongue in backing, substantially as specified.

12. The combination with a main tongue and a stub tongue, of a tongue-truck-frame-piece having a pivotal connection with said stub tongue and means for maintaining it at right angles to said main tongue, an axle furnished with a wheel and having a pivotal connection with said frame piece about an upright axis intersecting said axle, said axle being free to oscillate horizontally to a limited extent in respect to said frame-piece and independently of both said tongues to accommodate varying amounts of side draft, substantially as specified.

13. The combination with a main tongue and a stub tongue, of a tongue-truck-frame-piece having a pivotal connection with said stub tongue and means for maintaining it at right angles to said main tongue, an axle furnished with a pair of wheels and having a pivotal connection with said frame piece about an upright axis intersecting said axle, said axle being free to oscillate horizontally to a limited extent in respect to said frame piece and independently of both said tongues to accommodate varying amounts of side draft, and means for limiting the free oscillatory movement of said axle, substantially as specified.

14. The combination with a main tongue and a stub tongue, of a tongue truck pivotally connected to the stub tongue, and means for holding the truck from turning in respect to the stub tongue in backing, substantially as specified.

15. The combination with a main tongue and a stub tongue, of a tongue truck pivotally connected to the stub tongue, and means for holding the truck from turning in respect to the stub tongue in backing, said holding means being engageable automatically in backing and disengageable automatically in pulling, substantially as specified.

16. The combination with a main tongue and a stub tongue, of a tongue truck pivotally connected to the stub tongue, and a stop connection to limit the turning movement of the truck in respect to the stub tongue, said tongue truck having an axle free to oscillate horizontally to a limited extent independent of said tongues, said main tongue and stub tongue having engageable and disengageable devices for locking the two together in line with each other in backing, substantially as specified.

17. The combination with a main tongue and a stub tongue, of a tongue truck having a pivotal connection with the stub tongue, a slide attached to the main tongue for slidably connecting the main tongue with the truck and stub tongue, substantially as specified.

18. The combination with a main tongue a stub tongue, of a tongue truck having a pivotal connection with a stub tongue, a slide attached to the main tongue for slidably connecting the main tongue with the truck and stub tongue, said stub tongue having a projection or socket engaging said slide when the main tongue is in its rearmost position to lock the truck from turning in respect to the stub tongue, substantially as specified.

19. In a tongue support for harvesters and other machines, the combination with a stub or supplemental tongue connected to the machine, of a main tongue and a side draft resisting tongue truck having an axle free to oscillate horizontally to a limited extent and connections whereby the wheels of the truck automatically adjust their stubbleward inclination to the line of cut or advance as the side draft varies under the varying conditions of grain or ground and an adjustable stop to limit the oscillation of the axle and the stubbleward inclination of the wheel or wheels, substantially as specified.

20. The combination with a stub or supplemental tongue, of a main tongue, a tongue truck having a side draft resisting wheel and a horizontally oscillating axle, oscillating independently of said tongues and an adjustable stop on the truck to limit the oscillatory movement of the axle, said main tongue and stub tongue having engageable and disengageable devices for locking the two together in line with each other in backing, substantially as specified.

21. The combination with a stub or supplemental tongue, of a main tongue, and a tongue truck, having a frame piece or bolster at right angles to the main tongue and provided with an axle having a pivotal connection with said frame piece or bolster at one end thereof, and a slotted connection therewith at the other end thereof, and an adjustable stop to limit the turning movement of the axle about said pivot, substantially as specified.

22. The combination with a stub or supplemental tongue, of a main tongue, and a tongue truck, having a frame piece or bolster at right angles to the main tongue and provided with an axle having a pivotal connection with said frame piece or bolster at one end thereof and a slotted connection therewith at the other end thereof and connections whereby the axle automatically assumes a right angle position in respect to the main tongue in backing, and an inclined position in pulling, said truck frame piece or bolster having two slotted guides for the axle, and an adjustable stop to limit the pivotal movement of the axle to adapt the truck for use with a right hand or left hand machine, substantially as specified.

23. The combination with a stub or supplemental tongue, of a main tongue, a tongue truck, and means for locking or holding the main tongue, stub tongue and truck rigidly together with the main tongue and stub tongue in line with each other and the truck axle at right angles thereto when backing pressure is applied to the main tongue, said tongue truck having a horizontally oscillatory axle to adapt it to assume a right angle position in respect to the main tongue in backing and its wheels a stubbleward inclination to the line or cut or advance in pulling, substantially as specified.

24. The combination with a stub or supplemental tongue, of a main tongue, a tongue truck, and means for locking or holding the main tongue, stub tongue and truck rigidly together with the main tongue and stub tongue in line with each other and the truck axle at right angles thereto when backing pressure is applied to the main tongue, said tongue truck having a frame piece or bolster at right angles to the main tongue and provided with an axle having a pivotal connection with said frame piece or bolster at one end thereof, and a slotted connection therewith at the other end thereof and connections whereby the axle automatically assumes a right angle position in respect to the main tongue in backing and an inclined position in pulling, substantially as specified.

25. The combination with a supplemental tongue attached to a machine, of a tongue truck, pivotally connected to said supplemental tongue, and a main tongue extending at right angles from the tongue truck and having a sliding connection with said supplemental tongue to lock the two tongues together in backing, a draft rod extending at an angle to the supplemental tongue and having a hinged or toggle arm, and a push rod or cooperating toggle arm connected to the main tongue to cause the draft rod to push the main tongue forward in pulling, substantially as specified.

26. The combination with a stub tongue, of a main tongue, a tongue truck having a pivotal connection with the supplemental tongue and a slidable connection with the main tongue, said stub tongue having a locking or holding device thereon, and a slide attached to the main tongue and engaging said locking or holding device on the stub tongue when the main tongue is pushed backward in backing to lock the two tongues and truck together, substantially as specified.

27. The combination with a stub tongue, of a main tongue, a tongue truck having a pivotal connection with the supplemental tongue and a slidable connection with the main tongue, said stub tongue having a locking or holding device thereon, and a slide attached to the main tongue and engaging said locking or holding device on the stub tongue when the main tongue is pushed backward in backing to lock the two tongues and truck together, a draft rod extending at an angle to the stub tongue and provided with a hinged arm and a push rod extending from the hinged arm and connected to the tongue to push the tongue forward in pulling and disengage said slide from said holding device on the stub tongue, substantially as specified.

28. The combination with a stub or supplemental tongue, of a main tongue, and a tongue truck having a frame piece or bolster at right angles to the main tongue and provided with an axle having a pivotal connection with said frame piece or bolster at one end thereof, and a slotted connection therewith at the other end thereof, and connections whereby the axle automatically assumes a right angle position in respect to the main tongue in backing, and an inclined position in pulling, said tongue truck having an upright laterally rocking standard pivotally connected at its lower end to said frame piece or bolster, substantially as specified.

29. The combination with a stub or supplemental tongue, of a main tongue, a tongue truck having a side draft resisting wheel and a horizontally oscillating axle, and a laterally rocking upright standard, substantially as specified.

30. The combination with a supplemental tongue attached to a machine, of a tongue pivotally connected to said supplemental tongue, and a main tongue, extending at right angles from the tongue truck and having a sliding connection with said supplemental tongue to lock the two tongues together in backing, said tongue truck having a horizontally oscillatory axle, substantially as specified.

31. The combination with a supplemental tongue attached to a machine, of a tongue truck pivotally connected to said supplemental tongue, and a main tongue, extending at right angles from the tongue truck and having a sliding connection with said supplemental tongue to lock the two tongues together in backing, said tongue truck having a horizontally oscillatory axle, and an upright laterally rocking standard, substantially as specified.

32. The combination with a supplemental tongue attached to a machine, of a tongue truck pivotally connected to said supplemental tongue, and a main tongue extending at right angles from the tongue truck and having a sliding connection with said supplemental tongue to lock the two tongues together in backing, said tongue truck having a horizontally oscillatory axle, and an upright laterally rocking standard, a draft rod extending at an angle to the supplemental tongue and provided with a hinged arm, and a push rod connecting said hinged arm and the main tongue, substantially as specified.

33. The combination with a stub or supplemental tongue attached to the machine, of a main tongue, a tongue truck having a pivotal connection with the supplemental tongue, and a sliding connection with the main tongue, and interengaging devices for holding the main tongue and supplemental tongue from turning or swinging horizontally in respect to each other, said holding devices being engaged by the backward movement of the main tongue and disengaged by its forward movement, a draft rod extending at an angle to the stub tongue and provided with a hinged arm, and a push rod connecting said hinged arm with the main tongue to push it forward and disengage said holding devices, said tongue truck having a horizontally oscillating axle, substantially as specified.

34. The combination with a stub or supplemental tongue attached to the machine, of a main tongue, a tongue truck having a pivotal connection with the supplemental tongue and a sliding connection with the main tongue, and interengaging devices for holding the main tongue and supplemental tongue from turning or swinging horizontally in respect to each other, said holding devices being engaged by the backward movement of the main tongue and disengaged by its forward movement, a draft rod extending at an angle to the stub tongue and provided with a hinged arm, and a push rod connecting said hinged arm with the main tongue to push it forward and disengage said holding devices, said tongue truck having a horizontally oscillatory axle, substantially as specified.

35. The combination with a stub or supplemental tongue attached to the machine, of a main tongue, a tongue truck having a pivotal connection with the supplemental tongue and a sliding connection with the main tongue, and interengaging devices for holding the main tongue and supplemental tongue from turning or swinging horizontally in respect to each other, said holding devices being engaged by the backward movement of the main tongue and disengaged by its forward movement, a draft rod extending at an angle to the stub tongue and provided with a hinged arm, and a push rod connecting said hinged arm with the main tongue to push it forward and disengage said holding devices, said tongue truck having a horizontally oscillatory axle, and an adjustable stop to limit the horizontal oscillation of the truck axle and the stubbleward inclination of the truck wheels, substantially as specified.

36. The combination with a main tongue and a stub tongue, of a tongue truck having a pivotal connection with the stub tongue, a slide attached to the main tongue for slidably connecting the main tongue with the truck and stub tongue, said stub tongue having a projection or socket engaging said slide when the main tongue is in its rearmost position to lock the truck from turning in respect to the stub tongue, said truck having a horizontally oscillatory axle, substantially as specified.

37. The combination with a main tongue and a stub tongue, of a tongue truck having a pivotal connection with the stub tongue, a slide attached to the main tongue for slidably connecting the main tongue with the truck and stub tongue, said stub tongue having a projection or socket engaging said slide when the main tongue is in its rearmost position to lock the truck from turning in respect to the stub tongue, a draft rod having a hinged arm, and a push rod connecting said hinged arm and the main tongue to disengage said slide from said projection or socket on the stub tongue, substantially as specified.

38. The combination with a main tongue and a stub tongue, of a tongue truck having a pivotal connection with the stub tongue, a slide attached to the main tongue for slidably connecting the main tongue with the truck and stub tongue, said stub tongue having a projection or socket engaging said slide when the main tongue is in its rearmost position to lock the truck from turning in respect to the stub tongue, a draft rod having a hinged arm, and a push rod connecting said hinged arm and the main tongue to disengage said slide from said projection or socket on the stub tongue, and said tongue truck having a horizontally oscillatory axle, substantially as specified.

39. The combination with a stub or supplemental tongue, of a main tongue, a tongue truck having a side draft resisting wheel and a horizontally oscillating axle, and an adjustable stop on the truck to limit the oscillatory movement of the axle, said truck having means for holding said axle at right angles to the main tongue in backing, substantially as specified.

40. The combination with a main tongue and stub tongue, of a tongue-truck-frame-piece pivotally connected to said stub-tongue, and provided with means for maintaining it at right angles to said main tongue, an axle furnished with a wheel and free to oscillate horizontally to a limited extent in respect to said frame piece and having a pivotal connection therewith at one end and a slotted connection therewith at the other, an adjustable stop to limit the oscillatory movement of said axle in respect to said frame piece, said axle being free to so oscillate horizontally independently of both said tongues, and means for maintaining said tongues in line with each other and said axle at right angles thereto in backing, substantially as specified.
41. The combination with the main tongue and supplemental tongue, of a tongue truck having a stubbleward inclined wheel, and means for causing the truck wheel to automatically assume a position parallel to the main tongue in backing, substantially as specified.

42. The combination with the main and stub tongues of a main truck having a pivotal connection with the stub tongue, and means for automatically locking said truck from turning in respect to the stub tongue in backing, substantially as specified.

43. The combination with the main tongue and supplemental tongue, of a tongue truck having a stubbleward inclined wheel, and means for causing the truck wheel to automatically assume a position parallel to the main tongue in backing, and means for locking the tongue truck from turning in respect to the supplemental tongue in backing, substantially as specified.

44. The combination with a stub or supplemental tongue, of a main tongue, a truck frame piece or bolster, an axle furnished with a wheel and pivotally connected to said truck frame piece or bolster, said axle having a free limited oscillatory movement independent of said tongues, and means for limiting said oscillatory movement of said axle substantially as specified.

45. The combination with a stub or supplemental tongue, of a main tongue, a truck frame piece or bolster, an axle furnished with a wheel and pivotally connected to said truck frame piece or bolster and having a free limited oscillatory movement independent of said tongue and a slotted guide to limit the pivotal or oscillatory movement of said axle, substantially as specified.
46. The combination with a stub or supplemental tongue, of a main tongue, a truck frame piece or bolster, an axle furnished with a wheel and pivotally connected to said truck frame piece or bolster, a laterally rocking upright standard pivotally connected to said truck frame piece or bolster, substantially as specified.

47. The combination with a stub or supplemental tongue, of a main tongue, a truck frame piece or bolster, an axle furnished with a wheel and pivotally connected to said truck frame piece or bolster, a laterally rocking upright standard pivotally connected to said truck frame or bolster, said truck frame piece or bolster having an upright web furnished with stops to limit the rocking movement of said standard, and said standard having a slotted lower end, substantially as specified.

48. The combination with a stub or supplemental tongue, of a main tongue, a truck frame piece or bolster, an axle furnished with a wheel and pivotally connected to said truck frame piece or bolster, an upright standard connected to said truck frame piece or bolster and provided with a guide plate or flange at its upper end, a longitudinally movable slide mounted to reciprocate thereon, a hinge plate connecting said slide with said main tongue, and a pivot connecting said supplemental tongue with said upright standard, substantially as specified.

49. The combination with a stub or supplemental tongue, of a main tongue, a truck frame or bolster, an axle furnished with a wheel and pivotally connected with said truck frame or bolster, an upright standard connected to said truck frame piece or bolster and provided with a guide plate or flange at its upper end, a longitudinally movable slide mounted to reciprocate thereon, a hinge plate connecting said slide with said main tongue, and a pivot connecting said supplemental tongue with said upright standard, a hinge plate secured to said supplemental tongue and provided with a socket engaging the rear end of said slide when the main tongue is in its rearward position, substantially as specified.

50. The combination with a main tongue and a stub tongue, of a tongue-truck-framepiece having a pivotal connection with said stub tongue and means for maintaining it at right angles to said main tongue, an axle furnished with a pair of side draft resisting wheels and having a pivotal connection with said frame piece and free to oscillate horizontally to a limited extent in respect thereto and independently of both of said tongues, the pivotal connection of said axle with said frame piece being to one side of the middle of the axle, substantially as specified.

51. The combination with a main tongue and a stub tongue, of a tongue-truck-framepiece having a pivotal connection with said stub tongue and means for maintaining it at right angles to said main tongue, an axle furnished with a pair of side draft resisting wheels and having a pivotal connection with said frame piece and free to oscillate horizontally to a limited extent in respect thereto and independently of both of said tongues, the pivotal connection of said axle with said frame piece being nearer the grainward end of the axle, and means for limiting said free oscillatory movement of said axle, substantially as specified.

52. The combination with a stub or supplemental tongue and a main tongue, of a tongue truck having a horizontally oscillatory axle, a truck frame piece or bolster and an upright standard connected to said bolster to one side of the middle thereof so as to throw the greater weight on the outer wheel, substantially as specified.

53. The combination with a stub or supplemental tongue, of the main tongue and a two wheeled tongue truck pivotally connected to the stub or supplemental tongue at a point nearer to the outer wheel than the inner wheel, substantially as specified.

54. The combination with a stub or supplemental tongue and a main tongue, of a two wheeled tongue truck having a truck frame piece or bolster and an upright standard connected to said frame piece or bolster near the outer end thereof and to which said stub or supplemental tongue is pivotally connected, substantially as specified.

55. The combination with a stub or supplemental tongue and a main tongue, of a two wheeled tongue truck having a truck frame piece or bolster and an upright standard connected to said frame piece or bolster near the outer end thereof and to which said stub or supplemental tongue is pivotally connected, said upright standard having a pivotal connection at its lower end with said truck frame piece or bolster, substantially as specified.

56. The combination with a stub or supplemental tongue and a main tongue, of a two wheeled tongue truck having a frame piece or bolster and a removable upright standard and means for adjustably connecting said standard with the truck frame piece or bolster in different positions, substantially as specified.

57. The combination with a stub or supplemental tongue and a main tongue, of a tongue truck having a truck frame piece or bolster and an upright standard adapted to be connected thereto in different positions, substantially as specified.

58. The combination with a stub or supplemental tongue, of a tongue truck having an axle with two wheels thereon, a truck frame piece or bolster pivotally connected with said axle nearer the inner wheel end than the outer wheel end and an upright standard rising from said frame piece or bolster nearer the outer wheel end and to which said stub or supplemental tongue is pivotally connected, substantially as specified.

59. The combination with a main tongue and stub tongue, of a tongue truck pivotally connected to the front end of the stub tongue and having a horizontally oscillatory axle, said tongue truck having two wheels and said axle oscillating about a point nearer the inner truck wheel than the outer truck wheel, substantially as specified.

60. The combination with a main tongue and stub tongue, of a tongue truck pivotally connected to the front end of the stub tongue and having a horizontally oscillatory axle, said tongue truck having two wheels and said axle oscillating about a point nearer the inner truck wheel than the outer truck wheel, and said tongue truck having an upright standard nearer the outer wheel than the inner wheel and to which the front end of the stub tongue is pivoted, substantially as specified.

61. The combination with a stub or supplemental tongue, of a tongue truck having an axle with two wheels and an upright standard nearer the stubbleward wheel than the grainward wheel and to which said stub or supplemental tongue is pivotally connected so that in turning, the stubbleward wheel being thus brought closer to the tongue will not strike the hind feet of the horse adjacent to the main tongue on the outside, substantially as specified.

WILLIAM M. WADLEIGH.

Witnesses:
H. M. MUNDY,
EDMUND ADCOCK.